United States Patent Office 2,993,043
Patented July 18, 1961

2,993,043
PROCESS FOR THE MANUFACTURE OF DI-IMIDAZOLE DERIVATIVES
Adolf Emil Siegrist, Basel, Switzerland, assignor to Ciba Limited, Basel, Switzerland
No Drawing. Filed May 26, 1958, Ser. No. 737,539
Claims priority, application Switzerland July 19, 1957
5 Claims. (Cl. 260—240)

It is known that di-imidazole derivatives of the general formula (1) 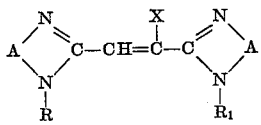

in which A represents a substituted or unsubstituted benzene nucleus of which two vicinal carbon atoms are connected to the two imidazole-nitrogen atoms, R and $R_1$ represent hydrogen or identical or different substituents, and X represents hydrogen or a hydroxyl group, can be made by splitting off water from a compound of the formula (2) 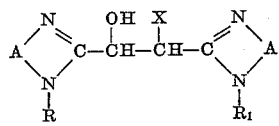

in which A, R, $R_1$ and X have the meanings given above, or from a salt of such compound.

The present invention is based on the observation that the splitting off of water from salts of compounds of the Formula 2 can be carried out with advantage at a raised temperature in a concentrated aliphatic carboxylic acid of low molecular weight and with the aid of urea.

The compounds of the Formula 2, salts of which are used as starting materials in the process of this invention, are known or can be made in known manner by reacting an ortho-diaminobenzene, of which one amino group is primary and the other amino group is at most secondary, or a salt of such ortho-diaminobenzene, with malic acid or tartaric acid or a functional derivative of either of these acids. If desired, the di-imidazole so obtained may be treated with an alkylating, hydroxyalkylating or aralkylating agent. A process for making compounds of the Formula 2 in this manner is described in U.S. patent application, Serial No. 530,608, now U.S. Patent No. 2,828,317, filed August 25, 1955, by Adolf Emil Siegrist et al.

The benzene nuclei fused on to the imidazole rings of the compounds of the Formula 1 may contain further substituents, for example, halogen atoms, especially chlorine atoms, lower alkyl groups, such as ethyl groups or advantageously methyl groups, or lower alkoxy groups such as ethoxy or methoxy groups. R and $R_1$ are advantageously hydrogen atoms. Alternatively, they may be, for example, aromatic or heterocyclic radicals or advantageously lower alkyl or lower hydroxyalkyl groups, such as methyl or hydroxyethyl groups, or they may be aralkyl groups, for example, benzyl groups. For instance R and $R_1$ each may represent a radical of the formula

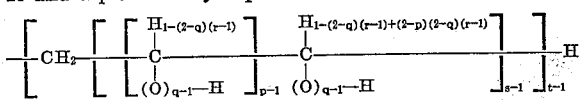

in which p, q, r, s and t each stand for a whole number of at the most 2 and R and $R_1$ therefore represent a hydrogen atom, a methyl group, an ethyl group, a propyl group, an allyl group, a hydroxyethyl group or a di-hydroxypropyl group.

The salts of the compounds of the Formula 2 used as starting materials are advantageously salts of strong non-oxidizing mineral acids, such as orthophosphoric acid, hydrochloric acid and especially sulfuric acid.

The splitting off of water is carried out in a concentrated aliphatic carboxylic acid of low molecular weight, for example, propionic acid, mono- or tri-chloracetic acid or a mixture of these chloracetic acids, or glycollic acid. Owing to the ease with which it can be obtained and the favorable results obtained therewith, it is especially advantageous to use acetic acid. The acid used should have as high a concentration as possible, and it is preferably used in a substantially anhydrous condition such, for example, as in the case of glacial acetic acid. It is of advantage to use a proportion of the acid such that the reaction mixture can be stirred easily. This is generally the case when the proportion of the acid is about twice the quantity of the imidazole compound. However, considerable deviation from this ratio is possible depending on the nature of the starting material and acid used.

The urea acts in the process of this invention not as a catalyst, but is consumed in the reaction, 1 molecular proportion of urea being consumed for each molecular proportion of di-imidazole compound that undergoes reaction. However, it is of advantage to use an excess of urea, and advantageously about 2 molecular proportions of urea per molecular proportion of the di-imidazole compound.

The splitting off of water is carried out at a raised temperature. It is of advantage to work at a temperature within the range of 100° C. to 200° C., preferably 100° C. to 150° C. If the reaction mixture boils at a temperature within that range as, for example, in the case of glacial acetic acid, it is usually suitable to carry out the splitting off of water at the boiling temperature of the reaction mixture.

The products may be worked up by methods in themselves known. In some cases, especially when glacial acetic acid is used, the compound of the Formula 1, which is formed by the splitting off of water, is obtained in an easily filterable form and separates out almost completely, so that it can easily be isolated by filtration.

The process of this invention is easy to carry out and usually leads to good yields. The process is especially valuable in that the final products are easily obtained in a very pure state. This is of importance, because the final products are optical brightening agents, and it is known that small amounts of impurities, which are not harmful in other products, considerably reduce the brightening action of these compounds.

The following examples illustrate the invention, the parts and percentages being by weight:

*Example 1*

A mixture of 378 parts of α:β-di-[benzimidazyl-(2)]-mono-hydroxyethane monosulfate of the formula

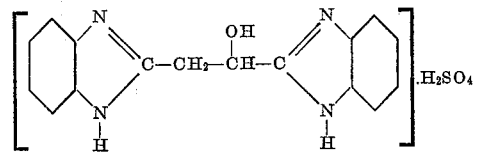

and 120 parts of urea in 500 parts by volume of glacial acetic acid are maintained at the gentle boil for 10 hours with the exclusion of air, while stirring. The light yellow reaction mixture is cooled to about 10° C., then further stirred for 2–3 hours at that temperature, and filtered. By washing the filter residue with glacial acetic acid and water, and drying it, there are obtained about 225 parts (corresponding to 86.5% of the theoretical yield) of α:β-di-[benzimidazyl-(2)]-ethylene of the formula

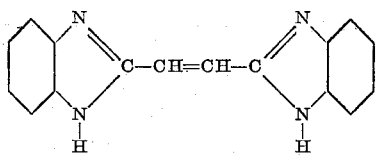

in the form of a slightly yellowish powder.

By using in this example, instead of 378 parts of α:β-di-[benzimidazyl-(2)]-mono-hydroxyethane monosulfate, an equimolecular quantity of α:β-di-[benzimidazyl-(2)]-mono-hydroxyethane dihydrochloride there is likewise obtained α:β-di-[benzimidazyl-(2)]-ethylene.

*Example 2*

The procedure is the same as described in Example 1, with the exception that there is used, instead of 378 parts of α:β-di-[benzimidazyl-(2)]-mono-hydroxyethane monosulfate, the equivalent quantity of the monosulfate of α:β-di-[6-methyl-benzimidazyl-(2)]-mono-hydroxyethane or of α:β-di-[6-methoxy-benzimidazyl-(2)]-mono-hydroxyethane or of α:β-di-[6-chloro-benzimidazyl-(2)]-mono-hydroxyethane or of α:β-di-[N-methyl-benzimidazyl-(2)]-mono-hydroxyethane or of α-[benzimidazyl-(2)] - β - [N - β - hydroxyethyl - benzimidazyl - (2)]-mono-hydroxyethane or of α:β-di-[N-ethyl-benzimidazyl-(2)]-mono-hydroxyethane or of α:β-di-[N-propyl-benzimidazyl-(2)]-mono-hydroxyethane or of α:β-di-[N-allyl-benzimidazyl-(2)]-mono-hydroxyethane or of α:β-di-[N-β - hydroxyethyl - benzimidazyl - (2)] - mono - hydroxyethane or of α:β-[N-β:γ-dihydroxypropyl-benzimidazyl-(2)]-mono-hydroxyethane or of α-[benzimidazyl-(2)]-β - [N - β:γ - dihydroxypropyl - benzimidazyl - (2)]-mono-hydroxyethane, and the corresponding ethylene derivatives are likewise obtained by this method of splitting off water.

*Example 3*

A mixture of 78 parts of the compound of the formula

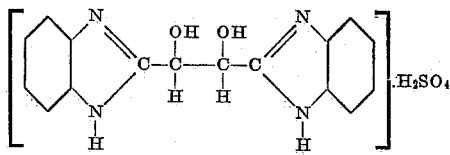

and 24 parts of urea in 350 parts by volume of glacial acetic acid is maintained at the gentle boil for 8–10 hours with the exclusion of air, while stirring. The yellow re-action mixture is cooled to about 10° C., then further stirred for a few hours at that temperature, and filtered. By washing the filter residue with glacial acetic acid and water, and drying it, the compound of the formula

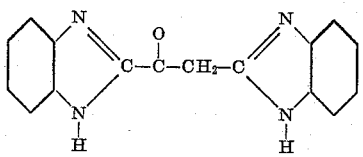

or

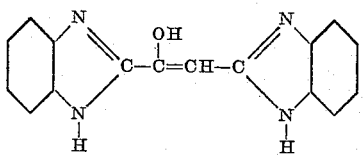

is obtained as a yellow powder.

What is claimed is:

1. In a process for the manufacture of a di-imidazole of the formula

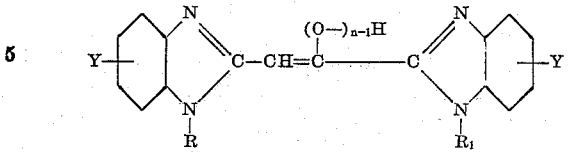

in which Y represents a member selected from the group consisting of chlorine, lower alkyl and lower alkoxy, R and $R_1$ each represents a member selected from the group consisting of hydrogen, methyl, ethyl, propyl, allyl, hydroxyethyl and dihydroxypropyl, and $n$ represents a whole number of at the most 2, wherein a mineral acid addition salt of a compound of the formula

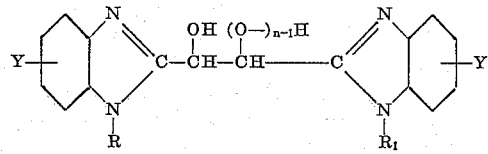

in which Y, R, $R_1$ and $n$ are as precedingly defined, is dehydrated, the step of effecting the dehydration by heating the said salt to a temperature within the range of from 100° C. to 200° C. in a concentrated saturated fatty acid having two to three carbon atoms, in admixture with at least one molecular proportion of urea for each molecular proportion of said salt.

2. In a process for the manufacture of a di-imidazole of the formula

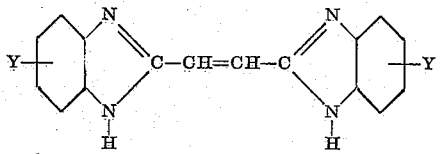

in which Y represents a member selected from the group consisting of chlorine, lower alkyl and lower alkoxy, wherein a mineral acid addition salt of a compound of the formula

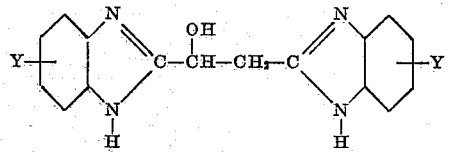

in which Y is as precedingly defined, is dehydrated, the step of effecting the dehydration by heating the said salt to a temperature within the range of from 100 to 200° C. in glacial acetic acid in admixture with at least one molecular proportion of urea for each molecular proportion of said salt.

3. The step defined in claim 2, wherein the dehydration is effected at a temperature within the range of from 100 to 150° C., and the glacial acetic acid is in admixture with more than one molecular proportion of urea for each molecular proportion of salt.

4. In a process for the manufacture of α:β-di-[benzimidazyl-(2)]-ethylene, wherein α:β-di-[benzimidazyl-(2)]-mono-hydroxyethane monosulfate is dehydrated, the step of effecting the dehydration by heating the said monosulfate to a temperature within the range from 100 to 150° C. in glacial acetic acid in admixture with about two molecular proportions of urea for each molecular proportion of said monosulfate.

5. In a process for the manufacture of α:β-di-[benzimidazyl-(2)]-ethylene, wherein α:β-di-[benzimidazyl-(2)]-mono-hydroxyethane dihydrochloride is dehydrated, the step of effecting the dehydration by heating the said dihydrochloride to a temperature within the range from 100 to 150° C. in glacial acetic acid in admixture with about two molecular proportions of urea for each molecular proportion of said dihydrochloride.

References Cited in the file of this patent

UNITED STATES PATENTS

| | | |
|---|---|---|
| 2,417,749 | Hagemeyer | Mar. 18, 1947 |
| 2,905,667 | Siegrist et al. | Sept. 22, 1959 |

FOREIGN PATENTS

| | | |
|---|---|---|
| 89,387 | Norway | Apr. 13, 1957 |

OTHER REFERENCES

Migrdichian: Organic Synthesis, vol. 2, pp. 835–836 (1957), Reinhold Publishing Corp., N.Y.